Aug. 23, 1927.
A. RABER
1,640,295
CENTER FINDER FOR SHAFTS
Filed Sept. 14, 1926
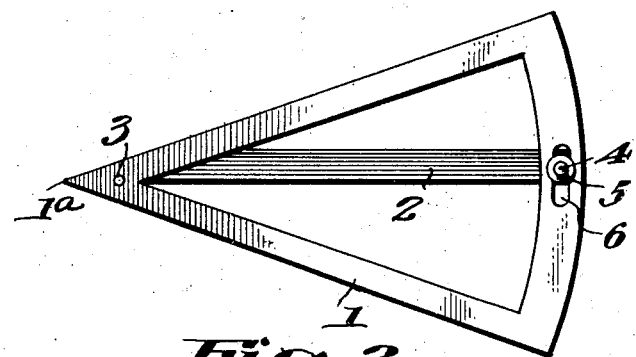
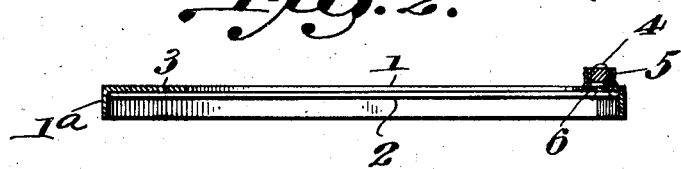
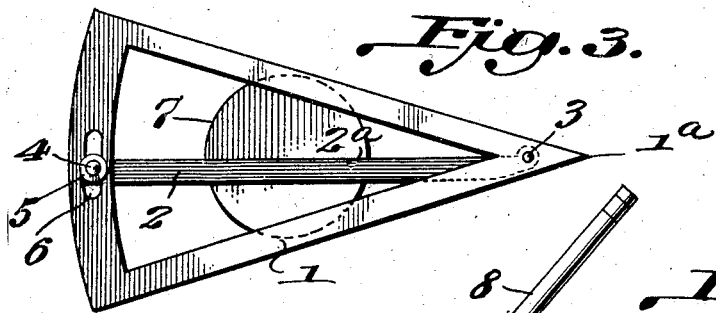
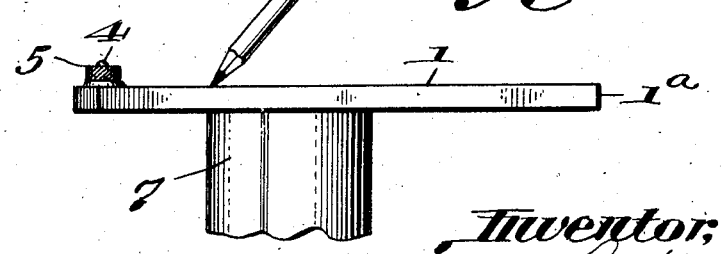
Inventor,
August Raber
By
Atty.

Patented Aug. 23, 1927.

1,640,295

UNITED STATES PATENT OFFICE.

AUGUST RABER, OF EVANSVILLE, INDIANA.

CENTER FINDER FOR SHAFTS.

Application filed September 14, 1926. Serial No. 135,373.

This invention relates to an instrument with which a mechanic may quickly, easily, and accurately, locate the exact center of a piece of shafting.

There are many occasions where a mechanic or machinist finds it necessary to locate the precise center of a piece of shafting, one instance being where it is necessary to locate the center of the shaft when quartering a locomotive shaft. At present, this operation requires several hours but with my instrument the center of the shaft can be located in less than a minute, thus saving much time and expense in an operation of this character.

The instrument can be made at small expense from sheet metal, for instance of sheet steel, and a pencil, scratch-awl, or other convenient marking device used in connection therewith to locate two or more diameters or radii of the circle representing the end of the shaft, the intersection of these lines indicating the exact center of the shaft.

One of the features of the invention is the provision of an adjustable rule or straight-edge as a part of the instrument for the purpose of compensating for expansion or contraction and for other reasons.

A practical embodiment of the invention is set forth hereinafter and shown in the accompanying drawings in which:

Figure 1, is a plan view;

Fig. 2, is a longitudinal section;

Fig. 3, is a plan view showing the instrument applied to the end of a shaft whose center is to be found and Fig. 4, is a side elevation of the end of a shaft with the instrument applied, showing how a pencil or other device may be used for locating the center.

While I have set forth the instrument as being a center finder and have described it hereinafter in that capacity, it is to be understood that the straight-edge or rule may have such capacity for adjustment that it may be used for marking chords in addition to marking radii and diameters to locate the center. It is to be understood that such variation and use are intended to be covered by the claims, where possible of such a construction.

The body 1 of the instrument is of general triangular shape, the sides, and preferably the base, being angular in cross-sectional shape so that they will overlap the end and the surface of the shaft.

The rule or straight-edge 2 pivoted, but preferably riveted, at 3 to the body 1 in such a manner that the edge 2ª of the rule 2 is pivoted in line with the apex 1ª of the body 1. The rule 2 is rendered adjustable by any suitable means as, for instance, a screw threaded pin 4 secured thereto which carries a thumb nut 5 and passes through a slot 6 in the base of the body 1. The thumb nut 5 enables the rule 2 to be set so that when the sides of the body 1 are applied to the shaft 7 as shown in Fig. 3, the edge 2ª will constitute the exact diameter of the shaft 7. By marking two or more diameters or radii with a pencil 8, as shown in Fig. 4, or by using a scratch-awl or other instrument, the exact center of the shaft 7 will be quickly located because it will be represented by the point of intersection of the diameters or radii which have been struck.

The adjustability of the rule 2 enables calibration to be had to compensate for expansion or contraction of the parts. Obviously, if a sufficiently wide range of adjustment for the rule 2 be provided, the instrument may be used for striking chords on any circular or cylindrical object.

What I claim is:

The herein described center finder for shafts, comprising elongated converging members which are angular in cross-sectional shape and unobstructed on their lower faces, a base member connecting said converging members, a rule having an unbroken straight edge, said rule being pivoted to the converging members with its straight edge substantially bisecting the angle defined by the converging members, and a laterally adjustable connection between the end of said rule and the base member, said converging members being of such length that their connecting base member will be located beyond the shaft end whose center is being found, to thereby prevent the base member from overlying the shaft end and interfering with the striking of intersecting lines by the use of said unbroken straight edge of the rule.

In testimony whereof I affix my signature.

AUGUST RABER.